United States Patent
Lee et al.

(10) Patent No.: US 7,698,469 B2
(45) Date of Patent: Apr. 13, 2010

(54) SERIAL TRANSMISSION CONTROLLER, SERIAL TRANSMISSION DECODER AND SERIAL TRANSMISSION METHOD THEREOF

(75) Inventors: Yu-Chu Lee, Hsinchu County (TW); Wen-Kuan Chen, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 188 days.

(21) Appl. No.: 11/930,122

(22) Filed: Oct. 31, 2007

(65) Prior Publication Data

US 2008/0104282 A1 May 1, 2008

(30) Foreign Application Priority Data

Nov. 1, 2006 (TW) .............................. 95140409 A

(51) Int. Cl.
*H03M 7/40* (2006.01)
(52) U.S. Cl. ............................... 710/5; 710/62; 710/65; 710/74; 341/65
(58) Field of Classification Search ................. 341/107, 341/67; 365/154, 185, 230, 269; 710/15, 710/201, 71, 103; 711/103.168, 200, 201; 713/310, 400
See application file for complete search history.

(56) References Cited

U.S. PATENT DOCUMENTS

| | | | | | |
|---|---|---|---|---|---|
| 5,600,812 | A | * | 2/1997 | Park | 711/200 |
| 5,648,774 | A | * | 7/1997 | Hsieh | 341/67 |
| 6,297,754 | B1 | * | 10/2001 | Miyasaka et al. | 341/65 |
| 7,058,732 | B1 | * | 6/2006 | Hauck | 710/15 |
| 7,190,287 | B2 | * | 3/2007 | Acharya et al. | 341/65 |
| 2004/0075596 | A1 | * | 4/2004 | Price | 341/65 |
| 2006/0239104 | A1 | * | 10/2006 | Lee et al. | 365/230.01 |

OTHER PUBLICATIONS

Sandisk, Sandisk Secure Digital Card, 2003, Sandisk, pp. 1-113.*

* cited by examiner

*Primary Examiner*—Henry W. H. Tsai
*Assistant Examiner*—Cheng-Yuan Tseng
(74) *Attorney, Agent, or Firm*—Jiang Chyun IP Office

(57) ABSTRACT

A serial transmission controller, a serial transmission decoder and a serial transmission method thereof are disclosed. First, a current address and an access address are compared to select one of a plurality of transmission address modes as an access address mode and then to produce corresponding address information. The transmission address modes use different bits to transmit the address information respectively. According to the access address mode, an access command is selected from a serial command set. Finally, the access command and the address information are transmitted to a serial interface serially. After the access command is encoded to different length of bits, the encoded access command is transmitted to the serial interface so as to reduce the transmission bits and improve the transmission efficiency.

20 Claims, 6 Drawing Sheets

| Commands | Frequency of Usage | Kaufmanns Encoding | Cycle (1) | Cycle (2) | Cycle (3) |
|---|---|---|---|---|---|
| Read 8-bit offset | 30.44% | 01 | 32 | 16 | 10 |
| Read 16-bit offset | 15.22% | 001 | 32 | 24 | 19 |
| Read next address | 11.41% | 0001 | 32 | 8 | 4 |
| Read 12-bit offset | 7.6% | 00001 | 32 | 20 | 17 |
| Read 4-bit offset | 6.8% | 000001 | 32 | 12 | 10 |
| Read 20-bit offset | 6% | 0000001 | 32 | 28 | 27 |
| Read state register | 5.32% | 00000001 | 8 | 8 | 8 |
| Write enable | 4.56% | 000000001 | 8 | 8 | 9 |
| Write next address | 3.8% | 0000000001 | 32 | 8 | 10 |
| Write 8-bit offset | 3.0% | 00000000001 | 32 | 16 | 19 |
| Write 20-bit offset | 2.28% | 000000000001 | 32 | 28 | 32 |
| Write 12-bit offset | 1.52% | 0000000000001 | 32 | 20 | 25 |
| Write 16-bit offset | 0.76% | 00000000000001 | 32 | 24 | 30 |
| Write 4-bit offset | 0.6% | 000000000000001 | 32 | 12 | 19 |
| Block remove | 0.38% | 0000000000000001 | 8 | 8 | 19 |
| Write state register | 0.07% | 00000000000000001 | 8 | 8 | 17 |
| Chip erase | 0.0% | 000000000000000001 | 8 | 8 | 18 |
| Command + Address | 100% |  | 294440 | 162592 (-44.7%) | 132945 (-54.8%) |

FIG. 6

SERIAL TRANSMISSION CONTROLLER, SERIAL TRANSMISSION DECODER AND SERIAL TRANSMISSION METHOD THEREOF

CROSS-REFERENCE TO RELATED APPLICATION

This application claims the priority benefit of Taiwan application serial no. 95140409, filed on Nov. 1, 2006. All disclosure of the Taiwan application is incorporated herein by reference.

BACKGROUND OF THE INVENTION

1. Field of the Invention

The present invention relates to a data transmission controller and decoder and a data transmission method thereof, and more particularly to a serial transmission controller and decoder and a serial transmission method thereof.

2. Description of Related Art

Conventionally, the access interface of memory device such as the flash memory uses an address and data bus having a parallel transmission interface. However, this type of interface requires a large number of leads and a higher chip packaging cost. Therefore, to reduce the number of leads, a serial transmission interface, for example, a serial peripheral interface (SPI) is widely adopted.

FIG. 1 is a diagram showing the data transmission pathways of a conventional serial peripheral interface. As shown in FIG. 1, the main control terminal 150 and the SPI flash memory 100 (the controlled terminal) transmit information to each other through the serial transmission interface. The serial transmission interface includes the SPI controller 160 of the main control terminal 150 and the SPI controller 110 of the SPI flash memory. The SPI controller 160 and the SPI controller 110 communicate with each other through the serial clock signal SCK, the enable signal CE_B and the external data. The SPI controller 110 and the flash memory 120 inside the SPI flash memory 100 communicate with each other through the address data, the internal data, the enable signal CE_B, the write-enable signal WE_B and the read-enable signal OE_B.

FIG. 2 is a clock diagram of the data transmission in FIG. 1. The SPI interface in FIG. 1 uses four leads (that is, the DI, DO, SCK and CE leads) to carry out synchronous serial communication. The CE lead transmits the enable signal CE-B. The DI and DO leads are used to transmit data into and out of the flash memory respectively. The SCK lead is used to transmit a clock signal so as to synchronize the data transmission of the flash memory. In the rising edge of the serial clock signal (SCK), data is latched into the flash memory. In the falling edge of the serial clock signal (SCK), data is transmitted from the flash memory. Because the data is transmitted in serially, the flash memory with this SPI interface needs fewer leads.

However, the current serial transmission interface (SPI) uses a fixed field length to transmit different control commands and address information. Moreover, different control commands are used to transmit related data bits. Thus, if the data read-out addresses are discontinuous, command and address bits must be re-submitted. Hence, the transmission efficiency is low so that the conventional SPI can hardly provide the bandwidth requirement of current high-speed systems.

SUMMARY OF THE INVENTION

Accordingly, the present invention provides a serial transmission controller capable of selecting a suitable access command according to different access address modes, wherein a different transmission address mode uses different bits to transmit address information so that the transmission bits are reduced. Furthermore, the present invention also performs a variable length encoding of the access command to improve the transmission efficiency.

The present invention provides a serial transmission decoder capable of decoding a corresponding access address mode according to a received access command, wherein different transmission address mode uses different bits to transmit address information so that transmission time is reduced. Furthermore, the variable length encoded access command can be decoded to increase transmission efficiency.

The present invention provides a serial transmission method with a suitable access command selected according to different access address mode, wherein different transmission address mode uses different bits to transmit address information so that the transmission bits are reduced. Moreover, the present invention also performs a variable length encoding of the access command so that commands with a higher operating frequency are encoded with shorter bits so as to increase system read-out efficiency and satisfy the bandwidth requirements of high-speed systems.

To achieve these and other advantages and in accordance with the purpose of the invention, as embodied and broadly described herein, the invention provides a serial transmission controller for transmitting an access command corresponding to an access address to a serial interface. The serial transmission controller includes a-current address register, an address encoder and a serial interface encoder. The current address register stores the current address. The address encoder is coupled to the current address register for comparing the current address and the access address and selecting an access address mode from a plurality of transmission address modes, and producing address information correspondingly. The serial interface encoder is coupled to the address encoder for transmitting the access command and the address information to the serial interface in a way of serial transmission. The serial transmission controller selects the access command from a serial command set according to the access address mode. The serial command set includes a plurality of command types. At least one of the command types can be used in the transmission address modes. Furthermore, the transmission address modes use different bits to transmit the address information respectively.

According to the serial transmission controller in the embodiment of the present invention, the serial transmission controller further includes a variable length encoder. After the variable length encoder has encoded the access command to different length of bits, the encoded access command is transmitted to the serial interface serially through the serial interface encoder.

According to the serial transmission controller in the embodiment of the present invention, the foregoing variable length encoder encodes the access command according to the usage frequency statistics of the various types of access commands using different transmission address modes in such a way that the ones having a higher frequency of usage are encoded using a smaller length of bits.

According to the serial transmission controller in the embodiment of the present invention, wherein, after the address encoder has selected the access address mode, the serial transmission controller saves the access address in the current address register so as to renew the current address.

From another point of view, the present invention also provides a serial transmission method for transmitting an access command corresponding to an access address to a serial interface. The method includes the following steps. First, the current address and the access address are compared to select one of a plurality of transmission address modes as an access address mode and then to produce corresponding address information. Then, according to the access address mode, an access command is selected from a serial command set. The serial command set includes a plurality of command types, and at least one of these command types can be used in the transmission address modes. The transmission address modes use different bits to transmit the address information respectively. Finally, the access command and the address information are transmitted to the serial interface by serial transmission.

According to the serial transmission method in the embodiment of the present invention, the serial transmission method further includes saving the current address, and after selecting the access address mode, the current address is renewed by the access address.

According to the serial transmission method in the embodiment of the present invention, the transmission method further includes encoding the access command to different length of bits, and thereafter, the encoded access command is transmitted to the serial interface serially.

According to the serial transmission method in the embodiment of the present invention, wherein, according to the usage frequency statistics of the various types of access commands using different transmission address modes, the access commands with a higher frequency of usage are encoded using a smaller length of bits.

From another point of view, the present invention also provides a serial transmission decoder for receiving an access command from a serial interface to obtain an access address correspondingly. The serial transmission decoder includes a serial interface decoder, a current address register and an address decoder. The serial interface decoder is coupled to the serial interface for decoding the serial signal on the serial interface and obtaining the access command and address information. The current address register is used for saving the current address. The address decoder is coupled to the serial interface decoder and the current address register for producing an access address according to an access address mode of the transmission address modes, the address information and the current address, and thereafter, the current address is renewed by the access address. The serial transmission decoder determines the access address mode according to the access command. The access command belongs to a serial command set and the serial command set includes a plurality of command types. At least one of the command types can be used in the transmission address modes. The transmission address mode respectively uses different bits to transmit the address information.

According to the serial transmission decoder in the embodiment of the present invention, the serial transmission decoder further includes a variable-length decoder for decoding the access command received from the serial interface with different length of bits, and thereafter, the serial transmission decoder determines the access address mode.

According to the serial transmission decoder in the embodiment of the present invention, the variable length decoder decodes the access command according to the usage frequency statistics of the various types of access commands using different transmission address modes respectively.

From another point of view, the present invention also provides another serial transmission method for receiving an access command from a serial interface to obtain an access address correspondingly. The method includes the following steps. First, a serial signal from the serial interface is received and decoded to obtain the access command and address information. Then, according to the access command, an access address mode of a plurality of transmission address modes is obtained, wherein the access command belongs to a serial command set. The serial command set includes a plurality of command types. At least one of the command types can use the transmission address modes. The transmission address mode uses different bits to transmit the address information respectively. Finally, the access address is produced according to the access address mode, the address information and the current address, and thereafter, the current address is renewed by the access address.

According to the serial transmission method in the embodiment of the present invention, the serial transmission method further includes decoding the access command received from the serial interface with different length of bits to obtain the access address mode.

According to the serial transmission method in the embodiment of the present invention, the serial transmission method further includes decoding the access command with different length of bits according to the usage frequency statistics of the access commands.

In the present invention, an access address mode is selected from a plurality of transmission address modes after the current address and the access address are compared. Since different transmission address mode uses different bits to transmit the address information, the transmission bits are reduced and transmission time is saved. Furthermore, the present invention also allows the modification of the fixed command field of the serial transmission interface by variable length of bits encoding. All the commands are ordered according to their frequency of usage so that the more commonly used commands are encoded with smaller bits. As a result, overall transmission time is lowered and transmission efficiency is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a statistical table showing the usage ratios of various commands in a serial command set according to one embodiment of the present invention.

DESCRIPTION OF THE PREFERRED EMBODIMENTS

Figure 1:
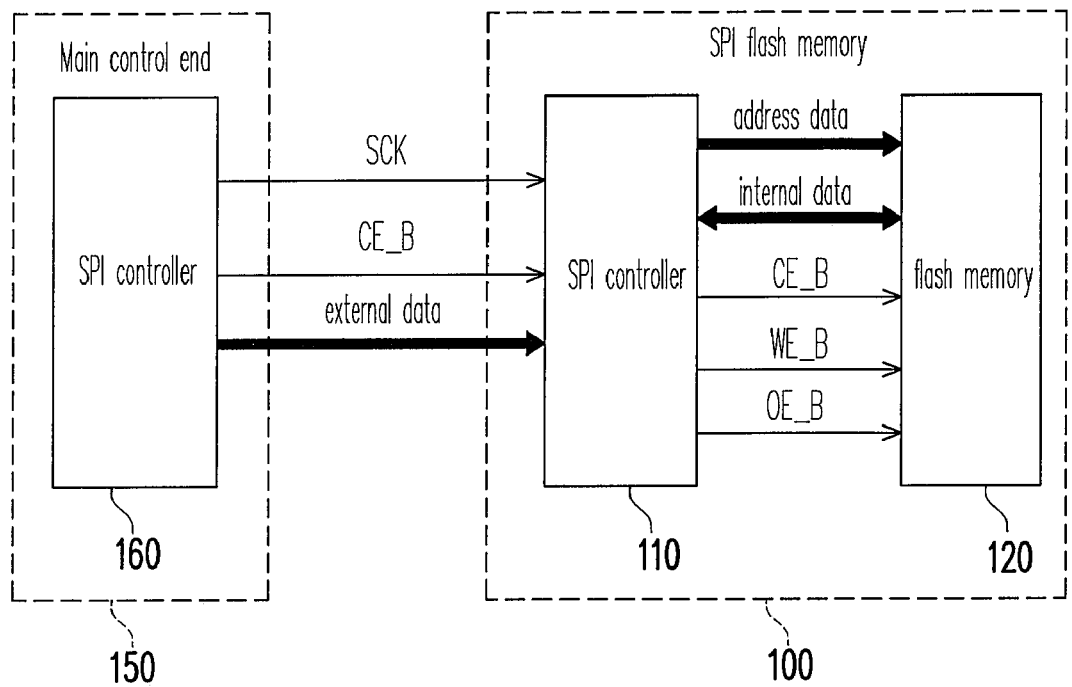
FIG. 1 is a diagram showing the data transmission pathways of a conventional serial peripheral interface.
Figure 2:
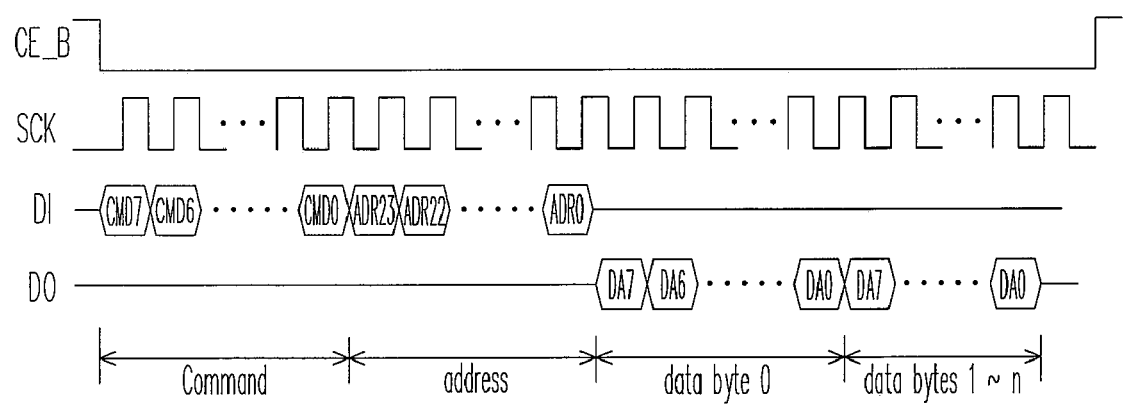
FIG. 2 is a clock diagram of the data transmission in FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
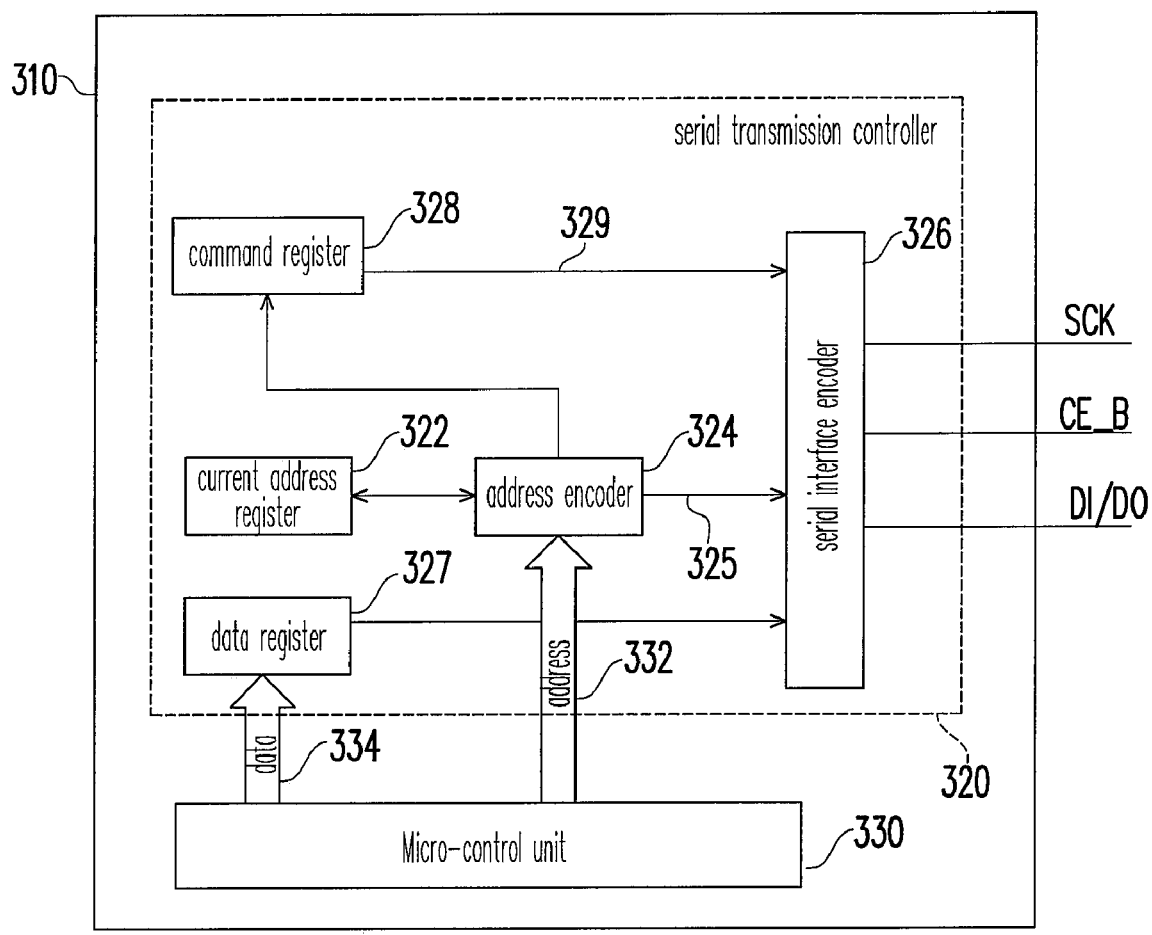
FIG. 3A is a block diagram of the transmission end of a serial peripheral interface according to one preferred embodiment of the present invention.

FIG. 3A is a block diagram of the transmission end of a serial peripheral interface according to one preferred embodiment of the present invention. As shown in FIG. 3A, the transmission terminal 310 in the present embodiment includes a serial transmission controller 320 and a micro-control unit 330. The serial transmission controller 320 includes a current address register 322, an address encoder 324, a serial interface encoder 326, a data register 327 and a command register 328.

When the micro-control unit 330 needs to access data, an access address 332 and data 334 must be transmitted. The data register 327 receives and stores the data 334 transmitted from the micro-control unit 330. The address encoder 324 receives the access address 332 transmitted from the micro-control unit 330 and compares with the current address stored in the current address register 322 so that an access address mode is selected from a plurality of address transmission modes and address information 325 is produced. The method of selecting the access address mode includes, for example, providing a plurality of preset values. These preset values are used for setting up a plurality of regions with each region corresponding to a specific transmission address mode. Therefore, after the access address 322 is compared with the current address stored in the current address register 322, a corresponding access address mode is obtained from the region pointed to by their difference value. After the address encoder 324 has selected the access address mode, the serial transmission controller 320 selects an access command 329 from the serial command set according to the selected access address mode and saves it in the command register 328. In the present embodiment, the address encoder 324 is responsible for selecting the access command 329 from the serial command set and saving it in the command register 328. However, anyone skilled in the art may understand that the operation is not limited to the address encoder 324. The operation can be accomplished through other control logic in the serial transmission controller 320. Next, through the SCK lead, the CE_B lead and the data buses DI/DO, the serial interface encoder 326 transmits the access command 329 and the address information 325 to the serial interface by serial transmission. The data buses (DI/DO) on the serial interface are used for transmitting the serial data. The SCK lead transmits the serial clock signal (SCK) and the CE_B lead transmits an enable command (CE_B) for activating the data transmission.

The serial transmission controller 320 selects the access command from the serial command set according to the access address mode selected by the address encoder 324. The serial command set includes a plurality of command types. At least one of the command types can be used to transmit any one of the address modes. The transmission address modes use different bits to transmit the address information respectively. For example, the command type is a read command or a write command and the transmission address modes use 4, 8, 12, 16 or 20 bits to transmit the address information 325.

Furthermore, after the address encoder 324 has selected the access address mode, the serial transmission controller 320 saves the access address 332 in the current address register 322 so as to renew the current address. The data register 327 is used for saving access data and the command register 328 is used for saving the access command 329. In addition, the transmission interface in the present embodiment is compatible to the serial peripheral interface (SPI) standard.

Figure 3B:
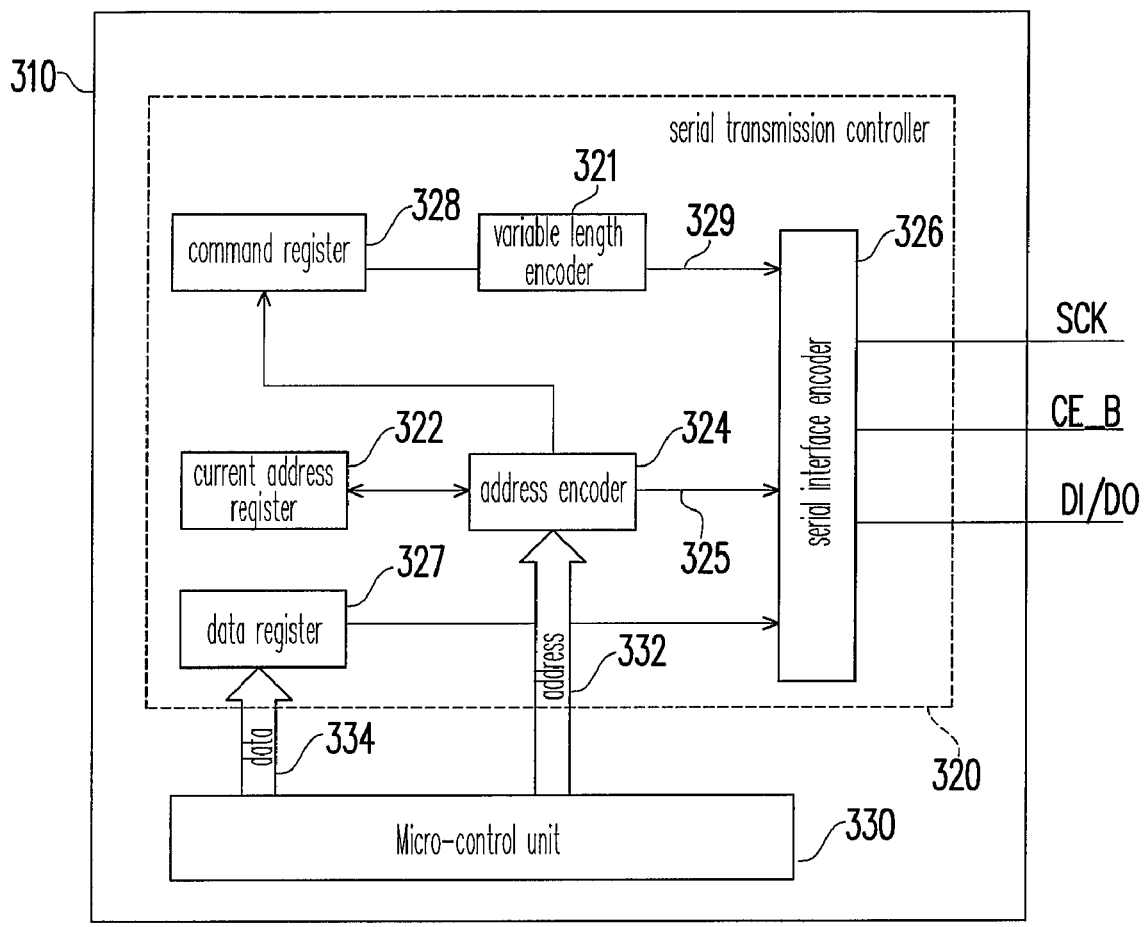
FIG. 3B is a block diagram of the transmission end of a serial peripheral interface according to another preferred embodiment of the present invention.

FIG. 3B is a block diagram of the transmission end of a serial peripheral interface according to another preferred embodiment of the present invention. As shown in FIG. 3B, the main difference between FIG. 3B and FIG. 3A is that the serial transmission controller 320 further includes a variable length encoder 321 (for example, a Huffman encoder). After the variable length encoder 321 has encoded the access command 329 to different length of bits, the encoded access command is transmitted to serial interface by serial transmission through the serial interface encoder 326.

The variable length encoder 321 encodes the access command 329 according to the usage frequency statistics of various commands for directing the different command types in the serial command set to use different transmission address modes so that the commands having a higher frequency of usage are encoded using a smaller length of bits. In the present embodiment, other components outside the variable length encoder 321 are identical to the ones in FIG. 3A. Hence, a detailed description is omitted.

Figure 4A:
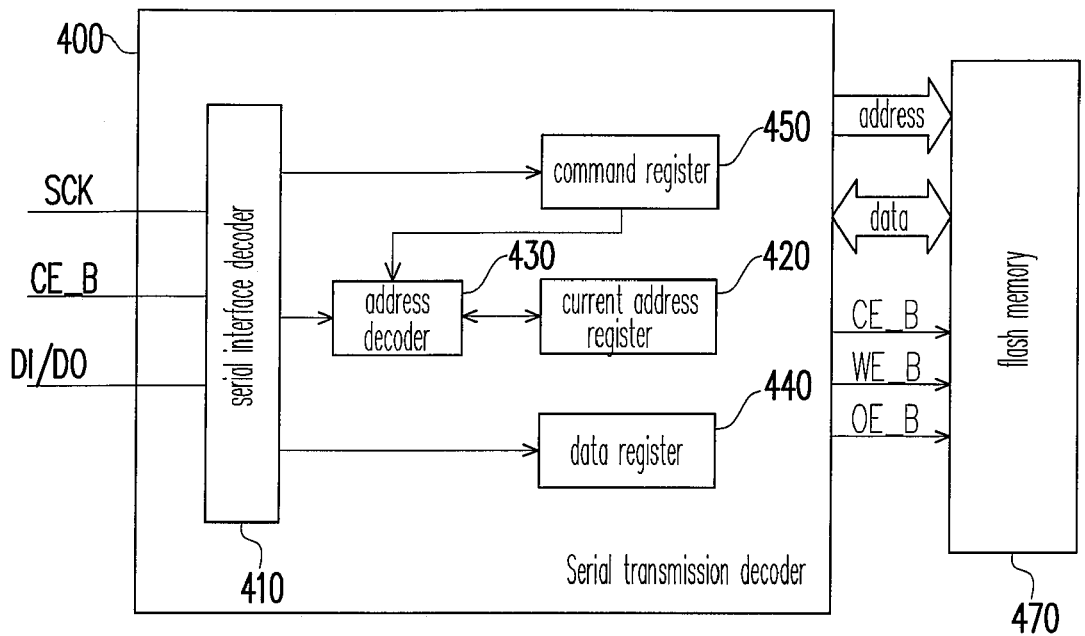
FIG. 4A is a block diagram of the receiving end of a serial peripheral interface according to one preferred embodiment of the present invention.

FIG. 4A is a block diagram of the receiving end of a serial peripheral interface according to one preferred embodiment of the present invention. As shown in FIG. 4A, the receiving end of the present embodiment includes a serial transmission decoder 400 and a flash memory 470. The serial transmission decoder 400 includes a serial interface decoder 410, a current address register 420, an address decoder 430, a data register 440 and a command register 450.

In the present embodiment, the current address register 420 is used to save the current address. The serial interface decoder 410 is coupled to the serial interface for decoding the serial signal on the serial interface to obtain the access command and the address information. The serial transmission decoder 400 determines and obtains the access address mode according to the access command. The access command belongs to a serial command set with a plurality of command types. The command type can use one of the transmission address modes and the transmission address modes use different bits (for example, uses 4, 8, 12, 16 or 20 bits) to transmit the address information respectively.

In addition, the command register 450 is used for saving the access command and the data register 440 is used for saving the data transmitted from the serial interface. The address decoder 430 is coupled between the serial interface decoder 410 and the current address register 420. According to one access address mode of the plurality of transmission address modes, the address information and the current address, the access address is produced. The current address saved by the current address register 420 is renewed by the access address.

The serial transmission decoder 400 can output the access address to various peripheral devices. In the present embodiment, the peripheral device is a flash memory 470. However, the present invention is not limited as such. The peripheral device can be, for example, a dynamic random access memory, or a non-programmable, one-time programmable or programmable non-volatile memory, or other peripheral controller that needs to communicate with a single chip system such as a general-purpose input/output (GPIO) controller and a parallel part controller. In fact, anyone skilled in the art may apply the present invention to other peripheral devices by deduction. The serial interface of the present embodiment is compatible with the serial peripheral interface (SPI) standard.

Figure 4B:
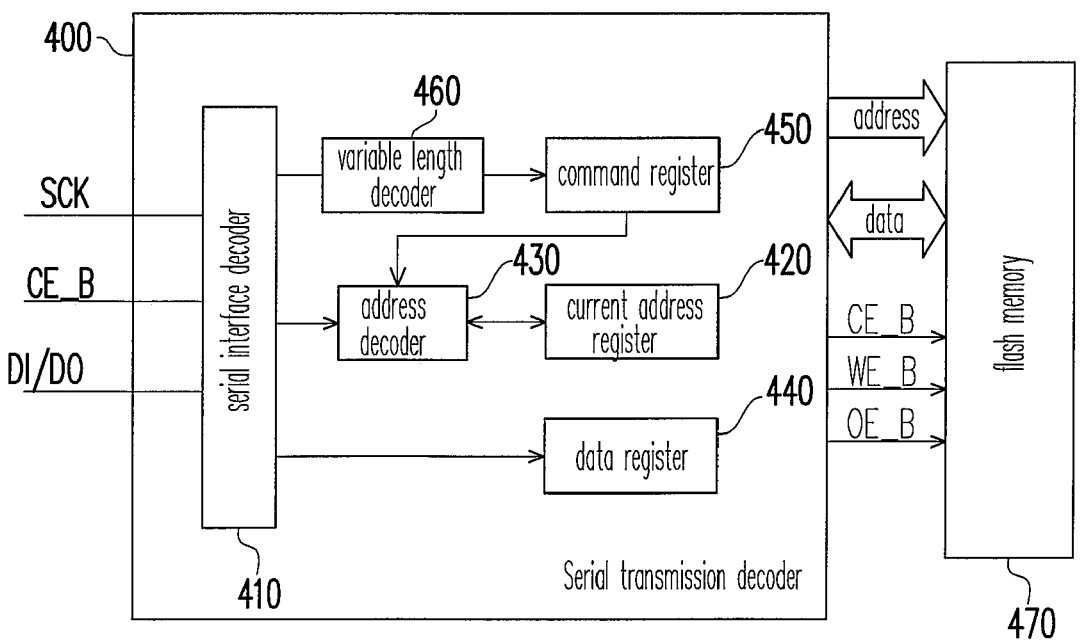
FIG. 4B is a block diagram of the receiving end of a serial peripheral interface according to another preferred embodiment of the present invention.

FIG. 4B is a block diagram of the receiving end of a serial peripheral interface according to another preferred embodiment of the present invention. As shown in FIG. 4B, the difference between FIG. 4B and FIG. 4A is that the serial transmission decoder 400 further includes a variable length decoder 460 (for example, a Huffman decoder). The variable length decoder 460 decodes the received access command with different length of bits and then the serial transmission decoder 460 determines and obtains the access address mode. The variable length decoder 460 decodes the access command according to the usage frequency statistics of various commands for directing the different command types in the serial command set to use different transmission address modes so that the commands having a higher frequency of usage are encoded using a smaller length of bits. In the present embodiment, other components outside the variable length decoder 460 are identical to the ones in FIG. 4A. Hence, a detailed description is omitted.

Figure 5A:
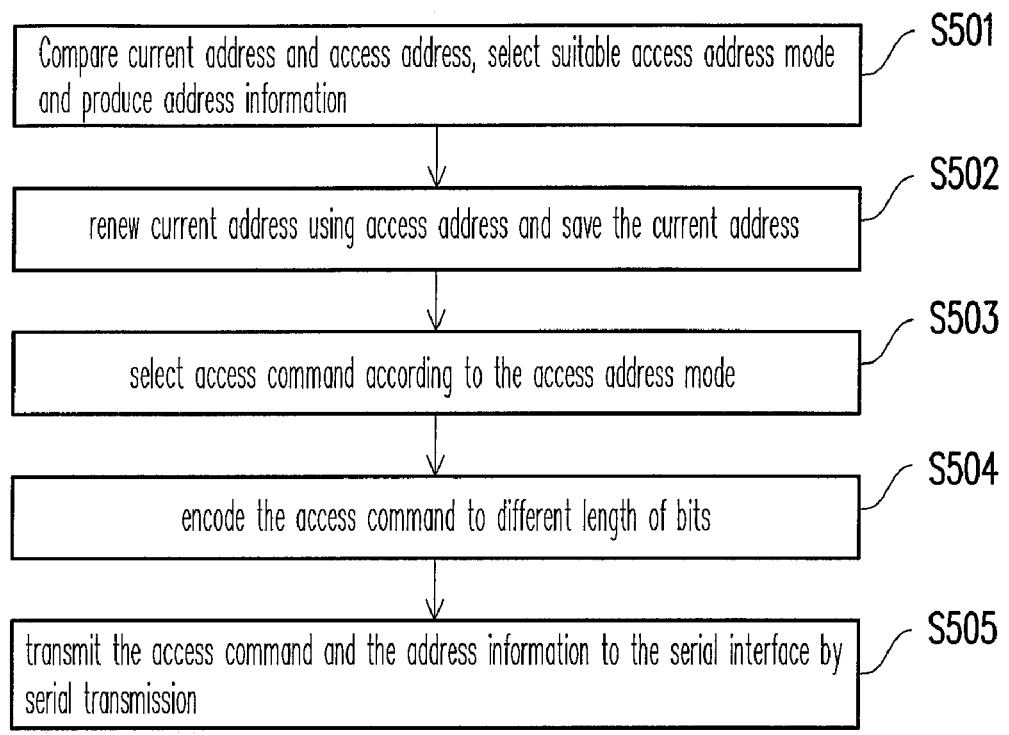
FIG. 5A is a flow diagram showing a method of transmitting serial transmission according to one embodiment of the present invention.

FIG. 5A is a flow diagram showing a method of transmitting serial transmission according to one embodiment of the present invention. The method includes transmitting the access command to the serial interface according to the access address. As shown in FIG. 5A, the current address and the access address are compared to select a suitable access address mode from a plurality of transmission address modes and produce address information (step S501). Then, according to the access address selected in step S501, the current address is renewed and the renewed current address is saved (step S502). Next, according to the access address mode, the access command is selected (step S503). The access command is encoded to different length of bits, for example, a Huffman encoding (step S504). Finally, the access command and the address information are transmitted to the serial interface by serial transmission.

In step S503, the access command belongs to a serial command set. The serial command set includes a plurality of command types. At least one of the command types can be used in any one of the transmission address modes. Furthermore, the transmission address modes use different bits to transmit the address information respectively.

In step S504, the rule for encoding the access command is aimed at the different command types (for example, the read command or the write command) in the serial command set. The access command is encoded according to the usage frequency statistics of the various commands in different transmission address modes. In other words, the commands with a higher frequency of usage are encoded using a smaller length of bits. Hence, the present step further reduces the transmission bits by encoding the access command to different length of bits. Even without the present step, the present invention can reduce the transmission bits and shorten the transmission time through selecting a different transmission address mode (using different bits) to transmit the address information. Furthermore, the serial interface in step S505 is compatible with the serial peripheral interface (SPI) standard.

Figure 5B:
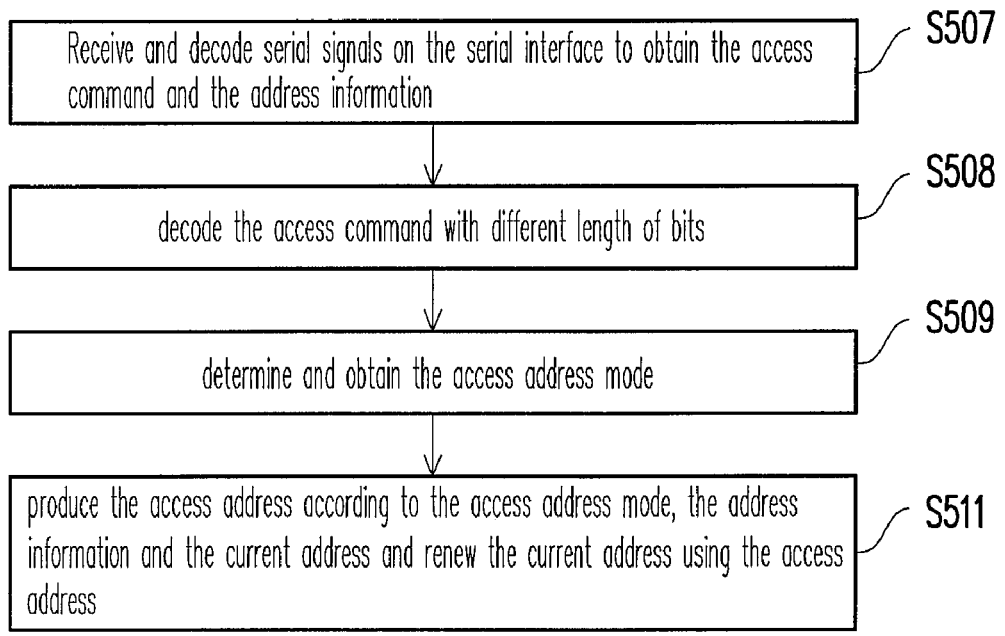
FIG. 5B is a flow diagram showing a method of receiving serial transmission according to another preferred embodiment of the present invention.

FIG. 5B is a flow diagram showing a method of receiving serial transmission according to another preferred embodiment of the present invention. The method includes receiving an access command from the serial interface to obtain the access address. As shown in FIG. 5B, a serial signal on the serial interface is received and decoded to obtain an access command and address information (step S507). Then, the access command with different length of bits is decoded, for example, by performing a Huffman decoding (step S508). Next, according to the decoded access command, the access address mode is determined and obtained (step S509). Finally, according to the access address mode, the address information and the current address, the access address is produced. The current address is renewed by the access address (step S511).

In the present embodiment, the access command with different length of bits is decoded in step S508 according to the usage frequency statistics of various commands for directing the different command types in the serial command set to use different transmission address modes so that the commands having a higher frequency of usage are encoded using a smaller length of bits. However, if the access command received has not been encoded to different length of bits in step S507 but has a fixed field length, then the command decoding operation in the present step is not needed.

FIG. 6 is a statistical table showing the usage ratios of various commands in a serial command set according to one embodiment of the present invention. The commands in the command field are common commands with different transmission address modes used in various transmissions. Because the current serial peripheral interface (SPI) uses a fixed command field length (8 bits) and a fixed address field length (24 bits) to transmit serial commands, the required cycle is 32 bits regardless of whether a read command or a write command is transmitted. Refer to the cycle (1) field in FIG. 6 for the data. However, in the present embodiment, the current address and the access address are compared and then an access address mode is selected from different transmission address modes according to the compare result. For example, when the current address and the access address are 7 bits, reading an access address mode with 8-bit offset is all that is required to access in the most efficient way. Therefore, when a transmission address mode of reading 8-bit offset is used, the required cycle is the sum of the command field length (8 bits) and the address field length (8 bits), which is a total of 16 bits. Compared with the original fixed field length method (32 bits), half a cycle is saved. Similarly, the other transmission address modes also reduces the required transmission bits (refer to the cycle (2) field in FIG. 6) compared with the prior techniques. In the present embodiment, assume that a total of 10000 serial commands are transmitted. When the original fixed field length serial command method is used, the number of cycles needed to transmit the commands is 294440. On the other hand, if the address field length is allowed to adjust, the number of cycles to transmit the command drops to 162592. The resulting statistics shows that the number of required cycles in present embodiment is lowered significantly by 44.7% from the prior technique.

The serial command set includes different command types (for example, read or write), and the different command types further include different transmission address modes (for example, read the next offset or read 4, 8, 12, 16, 20-bit offset). After gathering the usage frequency statistics of various commands and ordering them, the command for reading 8-bit offset has the highest frequency of usage and the command for reading 16-bit offset has the next highest frequency of usage. In the present embodiment, a variable length encoding method (for example, the Huffman encoding) is used to perform the encoding. The rule includes encoding the commands with higher frequency of usage to a smaller length of bits. For example, the command for reading 8-bit offset with the highest frequency of usage has the smallest Huffman encoded bits of just 2 bits. Since the cycle of the command for reading 8-bit offset is the sum of the command field length (2 bits) and the address field length (8 bits), the variable length encoding allows the number of bits needed to transmit command to drop from 32 bits to 10 bits. Similarly, the transmission bits of most of the other transmission address modes (refer to the cycle 3 field) are significantly reduced compared with the prior techniques.

Similarly, using the transmission of 10000 serial commands as a basis for statistical inferences, the command field and the address field together requires 294440 cycles when the original fixed field length serial method is used. If the adjustable address and command field length method of the present invention is used, the required cycles for the command and address field are only 132945. The resulting statistics shows that the number of required cycles in present embodiment is lowered significantly by 54.8% from the prior technique.

It should be noted that the serial command statistical table in FIG. 6 is only a simulation serving to show the obvious effects produced by the present invention and hence should not be used to limit the scope of the present invention. In fact, the command types in the serial command set or various transmission address modes can be adjusted according to the actual requirements.

In summary, the present invention provides a serial transmission controller and a serial transmission method that selects a preferred transmission address mode according to the access address and transmits address information with different bits according to different transmission address mode. Therefore, the transmission bits are reduced and the transmission time is shortened. Furthermore, the serial transmission controller and its serial transmission method of the present invention also allow a change from the fixed command field of the serial transmission interface by a variable bit length encoding. The commands are ordered according to their frequency of usage and the more commonly used commands are encoded with fewer bits. Thus, overall transmission time and overall length of the re-transmitted commands when the addresses are non-consecutive are reduced, and the transmission efficiency is increased.

The serial transmission decoder and serial transmission method of the present invention determines and obtains the access address mode according to the received access command. The access address mode is selected from a plurality of transmission address modes and the access address is produced according to the access address mode, the address information and the current address. Furthermore, because the transmission address modes use different bits to transmit the address information respectively, the transmission bits are reduced and the transmission time is shortened. In addition, the serial transmission decoder and its serial transmission method of the present invention also receive access commands encoded to different length of bits. This encoding method ranks the commands according to their frequency of usage so that the more frequently used commands are encoded with fewer bits. This has the effects of lowering overall transmission time even further and increasing the transmission efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A serial transmission controller for transmitting an access command corresponding to an access address to a serial interface, the serial transmission controller comprising:
   a current address register, for saving a current address;
   an address encoder, coupled to the current address register, for comparing the current address and the access address, and selecting an access address mode from a plurality of transmission address modes and producing address information correspondingly;
   a serial interface encoder, coupled to the address encoder, for transmitting the access command and the address information to the serial interface by serial transmission; and
   a variable length encoder, for encoding the access command to different length of bits, and transmitting the encoded access command through the serial interface encoder to the serial interface, wherein the variable length encoder uses the transmission address modes according to a usage frequency statistics of the access commands such that the access command with higher frequency of usage is encoded with smaller length of bits;
   wherein the serial transmission controller selects the access command from a serial command set according to the access address mode, the serial command set comprises a plurality of command types, at least one of the command types can be used in the transmission address modes, and the transmission address modes use different bits to transmit the address information respectively.

2. The serial transmission controller of claim 1, wherein the serial interface is compatible with a serial peripheral interface standard.

3. The serial transmission controller of claim 1, further comprising:
   a command register for saving the access command; and
   a data register for saving an access data corresponding to the access address.

4. The serial transmission controller of claim 1, wherein the serial transmission controller saves the access address to the current address register for renewing the current address after the address encoder has selected the access address mode.

5. A serial transmission method for transmitting an access command corresponding to an access address to a serial interface, the method comprising the steps of:
   comparing a current address with the access address and selecting one of a plurality of transmission address modes as an access address mode and producing corresponding address information;
   selecting the access command from a serial command set according to the access address mode, wherein the serial command set comprises a plurality of command types, at least one of the command types can be used in the transmission address modes, and the transmission address modes use different bits to transmit the address information respectively; and
   transmitting the encoded access command and the address information to the serial interface serially after the access command is encoded to different length of bits, wherein the access command is encoded according to the usage frequency statistics of the access commands, wherein the access command with a higher frequency of usage is encoded with smaller length of bits.

6. The serial transmission method of claim 5, further comprising the following steps:
   saving the current address; and
   renewing the current address by the access address after the access address mode is selected.

7. The serial transmission method of claim 5, wherein the serial interface is compatible with a serial peripheral interface standard.

8. A serial transmission decoder for receiving an access command from a serial interface to obtain an access address correspondingly, the serial transmission decoder comprising:
   a serial interface decoder, coupled to the serial interface, for decoding serial signals on the serial interface and obtaining the access command and address information;
   a current address register, for saving a current address; and
   an address decoder, coupled to the serial interface decoder and the current address register, for producing the access address according to an access address mode of a plurality of transmission address modes, the address information and the current address, and renewing the current address by the access address; and
   a variable length decoder, for decoding the access command with different length of bits received from the serial interface and then determining the access address mode through the serial transmission decoder, wherein the variable length decoder decodes the access command according to the usage frequency statistics of the access commands using different transmission address modes respectively;
   wherein the serial transmission decoder determines the access address mode according to the access command, the access command belongs to a serial command set, the serial command set comprises a plurality of command types, at least one of the command types can be used in the transmission address modes, and the transmission address mode respectively uses different bits to transmit the address information.

9. The serial transmission decoder of claim 8, wherein the serial interface is compatible with a serial peripheral interface standard.

10. The serial transmission decoder of claim 8, further comprising:
    a command register, for saving the access command, and
    a data register, for saving an access data corresponding to the access address.

11. A serial transmission method for receiving an access command from a serial interface to obtain an access address correspondingly, the method comprising the following steps:
    receiving serial signals on the serial interface and obtaining the access command and address information;
    decoding the access command with different length of bits received from the serial interface according to the usage frequency statistics of the access commands;
    obtaining an access address mode from a plurality of transmission address modes according to the access command, wherein the access command belongs to a serial command set, the serial command set comprises a plurality of command types, at least one of the command types can be used in the transmission address modes, and the transmission address mode uses different bits to transmit the address information respectively; and
    producing the access address according to the access address mode, the address information and a current address and then renewing the current address by the access address.

12. The serial transmission method of claim 11, wherein the serial interface is compatible with a serial peripheral interface standard.

13. The serial transmission controller of claim 1, wherein the serial interface interfacing with a memory device.

14. The serial transmission controller of claim 1, wherein the serial interface interfacing with a flash memory device.

15. The serial transmission method of claim 5, wherein the serial interface interfacing with a memory device.

16. The serial transmission method of claim 5, wherein the serial interface interfacing with a flash memory device.

17. The serial transmission decoder of claim 8, wherein the serial interface interfacing with a memory device.

18. The serial transmission decoder of claim 8, wherein the serial interface interfacing with a flash memory device.

19. The serial transmission method of claim 11, wherein the serial interface interfacing with a memory device.

20. The serial transmission method of claim 11, wherein the serial interface interfacing with a flash memory device.

* * * * *